United States Patent Office 3,081,333
Patented Mar. 12, 1963

3,081,333
NEW HALOGEN CONTAINING ORGANIC
PHOSPHORUS DERIVATIVES
Alfred Renner, Allschwil, Switzerland, assignor to Ciba
Limited, Basel, Switzerland, a company of Switzerland
No Drawing. Filed May 14, 1962, Ser. No. 194,681
Claims priority, application Switzerland May 17, 1961
3 Claims. (Cl. 260—461)

The present invention provides new halogenated organic phosphorus compounds which correspond to the general formula

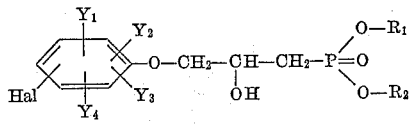

and are suitable for use as modifying agents for epoxy resins and for use in the synthesis of flameproof polyester resins. In the above formula Hal represents a halogen atom, more especially chlorine or bromine; each residue $Y_1$ to $Y_4$ represents a hydrogen or halogen atom, more especially chlorine or bromine, or a lower alkyl radical with 1 to 4 carbon atoms, and each residue $R_1$ and $R_2$ represents a lower alkyl, alkenyl or halogenalkyl radical with 1 to 4 carbon atoms.

The phosphorus compounds of the Formula I can be prepared by reacting a glycidyl ether of the general formula (II) 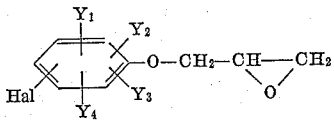

with a diester of phosphorous acid or its alkali metal salt of the formula (III) 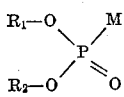

at an elevated temperature; in these formulae Hal represents a halogen atom, more especially chlorine or bromine; each radical $Y_1$ to $Y_4$ represents a hydrogen or halogen atom, more especially chlorine or bromine, or a lower alkyl radical with 1 to 4 carbon atoms, and each radical $R_1$ and $R_2$ represents a lower alkyl, alkenyl or halogenalkyl radical with 1 to 4 carbon atoms, and M represents a hydrogen atom or an alkali metal cation.

As diesters of phosphorous acid or their alkali metal salts suitable for use as starting materials in the present process there may be mentioned, for example: Dimethyl phosphite, diethyl phosphite, dipropyl phosphite, dibutyl phosphite, diallyl phosphite, di-(2-chlorethyl)-phosphite, as well as the sodium salts of said compounds.

The glycidyl ethers to be used as starting materials in the present process are derived from halogenated monophenols, such as ortho-, meta- or para-chlorophenol, ortho-, meta- or para-bromophenol, monochlorocresols, monobromocresols, monochloroxylenols, monobromoxylenols and more especially from higher halogenated phenols, such as 2:4-dichlorophenols, 2:4-dibromophenol, 2:4:6-trichlorophenol, 2:4:6-tribromophenol, tetrachlorophenol, tetrabromophenol or pentachlorophenol. As typical representatives there may be mentioned 2:4-dibromophenyl glycidyl ether, 2:4:6-tribromophenyl glycidyl ether, 2:4:6-trichlorophenyl glycidyl ether and pentachlorophenyl glycidyl ether.

To manufacture the new organic phosphorus compounds the reactants are heated at an elevated temperature, for example ranging from 50 to 200° C. and preferably from about 90 to 150° C. It is also possible to work in an inert solvent such as benzene, toluene, xylene, chlorobenzene or benzine and, if desired, in an inert gas, for example under nitrogen.

The new organic phosphorus compounds are valuable modifying agents for epoxy resins. Epoxy resins cured with the usual curing agents, such as polycarboxylic anhydrides or polyamines, in conjunction with the phosphorus compounds of the invention have the advantage of being flameproof or less combustible, and better heat distortion properties according to Martens (DIN).

Accordingly, the present invention further provides curable mixtures of
(a) Epoxy compounds having an epoxy equivalence greater than 1,
(b) Curing agents for polyepoxy compounds, and
(c) Organic phosphorus compounds of the Formula I.

The epoxy compounds incorporated in the curable mixtures of the invention have an epoxy equivalence greater than 1, that is to say they contain $n$ epoxide groups calculated from the average molecular weight, $n$ being a whole or fractional number greater than 1.

As is known, the usual methods for the manufacture of polyepoxy compounds are generally performed with commercial mixtures of compounds having molecular weights different from one another, the mixture further containing a proportion of compounds whose terminal epoxide groups have been partially hydrolysed. The analytically determined value of the epoxy equivalence of such commercial mixtures need not be a whole number, which is at least 2, but it must always be greater than 1.0.

As epoxy compounds of the kind defined above there are suitable, for example: Alicyclic polyepoxides such as vinylcyclohexene dioxide, limonene dioxide, dicyclopentadiene dioxide, ethyleneglycol-bis(3:4-epoxytetrahydrodicyclopentadien-8-yl) ether, (3:4-epoxy-tetrahydro-dicyclopentadien-8-yl)-glycidyl ether; epoxidized polybutadienes or copolymers of butadiene with ethylenically unsaturated compounds such as styrene or vinyl acetate; compounds containing two epoxy-cyclohexyl residues such as diethyleneglycol-bis-(3:4-epoxy - cyclohexane - carboxylate), bis-3:4-epoxy-cyclohexylmethyl succinate, 3:4-epoxy-6-methyl-cyclohexylmethyl-3:4-epoxy - 6 - methyl - cyclohexanecarboxylate and 3:4-epoxy-hexahydrobenzal-3:4-epoxycyclohexane-1:1-dimethanol.

Further suitable are polyglycidyl esters such as result from the reaction of a dicarboxylic acid with epichlorohydrin or dichlorohydrin in the presence of alkali. Such polyesters can be derived from aliphatic dicarboxylic acids such as succinic or adipic acid or more especially from aromatic dicarboxylic acids such as phthalic or terephthalic acid. There may be mentioned, for example, diglycidyl adipate and diglycidyl phthalate.

There are further suitable basic polyepoxy compounds such as are obtained by reacting a primary or secondary aliphatic or aromatic diamine, such as aniline, toluidine, 4:4'-diamino - diphenylmethane, 4:4' - di - (monomethylamino)-diphenylmethane or 4:4'-diamino-diphenylsulfone with epichlorohydrin in the presence of alkali.

Preferred use is made of polyglycidyl ethers such as are obtained by etherifying a dihydric or polyhydric alcohol or diphenol or polyphenol with epichlorohydrin or dichlorohydrin in the presence of alkali. These compounds may be derived from glycols such as ethyleneglycol, diethyleneglycol, triethyleneglycol, 1:3-propyleneglycol, 1:4-butyleneglycol, 1:5-pentanediol, 1:6-hexanediol, 2:4:6-hexanetriol, glycerol and more especially from diphenols or polyphenols such as resorcinol, pyrocatechol, hydroquinone, 1:4 - dihydroxynaphthalene, condensation products of phenol with formaldehyde of the type of the resoles or novolaks, bis-[para-hydroxyphenol]-methane, bis-[para-hydroxyphenyl] - methylphenylmethane, bis - [para-hydroxyphenyl]-tolylmethane, 4:4'-dihydroxydiphenyl, bis-[para-hydroxyphenyl]-sulfone and more especially bis-[para-hydroxyphenyl)-dimethylmethane.

Particularly suitable are epoxy resins that are liquid at room temperature, for example those from bis-(para-hydroxyphenyl)-dimethylmethane (bisphenol A) which contain about 3.8 to 5.8 epoxide equivalents per kg. Such epoxy resins correspond, for example, to the average formula

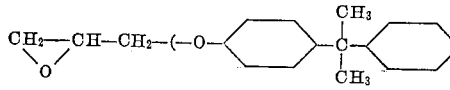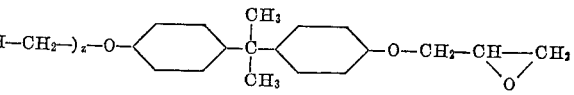

in which $z$ is a whole or fractional small number from 0 to 2.

It is also possible to use mixtures of two or more of the epoxy resins referred to above.

As curing agents for the epoxy compounds defined above there may be used basic or acidic compounds.

There may be mentioned amines or amides, such as aliphatic or aromatic primary, secondary or tertiary amines, for example mono-, di- and tributylamines, para-phenylenediamine, bis-(para-aminophenyl)-methane, bis-(para-aminophenyl)-sulfone, ethylene diamine, hydroxyethylethylenediamine, N:N-diethylethylene diamine, tetra-(hydroxyethyl)-diethylene triamine, diethylene triamine, triethylene tetramine, tetraethylene pentamine, N:N-dimethylpropylene diamine, trimethylamine, diethylamine, triethanolamine, Mannich's bases such as tris(dimethylaminomethyl)-phenol; piperidine, piperazine, guanidine and derivatives thereof, such as phenyl diguanidine, diphenylguanidine; dicyandiamide, urea - formaldehyde resins, melamine-formaldehyde resins, aniline-formaldehyde resins, polymers of aminostyrenes, polyamides, for example such as have been prepared from aliphatic polyamines with dimerized or trimerized unsaturated fatty acids ("Versamid"), polymeric polysulfides ("Thiokol"), isocyanates, isothiocyanates, phosphoric acid; polybasic carboxylic acids and their anhydrides, for example phthalic, tetrahydrophthalic, hexahydrophthalic, methylendomethylene tetrahydrophthalic anhydride, dodecenylsuccinic, hexachloro-endomethylene tetrahydrophthalic anhydride or endomethylene tetrahydrophthalic anhydride, maleic, succinic, pyromellitic dianhydride or mixtures thereof; polyphenols, for example resorcinol, hydroquinone, quinone, phenolaldehyde resins, oil-modified phenol-aldehyde resins; reaction products of aluminum alcoholates or phenolates with compounds of tautomeric reaction of the type of acetoacetic ester; Friedel-Crafts catalysts, for example aluminum trichloride, antimony pentachloride, tin tetrachloride, ferric chloride, zinc chloride, boron trifluoride, and their complexes with organic compounds, metal fluoborates such as zinc fluoborate; boroxines such as trimethoxy boroxine.

If desired, there may be added accelerators such as tertiary amines, quaternary ammonium compounds, metal chelates or strong Lewis bases, for example alkali metal alcoholates; also polyhydroxy compounds such as hexanetriol or glycerol.

The term "curing" as used in this context describes the conversion of the epoxy compound into an insoluble and infusible resin.

The curable mixtures of the invention may further contain suitable plasticisers such as dibutyl phthalate, dioctyl phthalate or tricresyl phosphate; inert diluents or so-called active diluents, more especially monoepoxides, for example butyl glycide or cresyl glycide.

Furthermore, there may be added to the curable mixtures of the invention at any stage prior to the curing the usual additives such as fillers, dyestuffs, pigments, flameproofing substances, mould lubricants or the like. Suitable extenders and fillers are, for example, asphalt, bitumen, glass fibers, mica, quartz meal, cellulose, kaolin, ground dolomite, colloidal silicon dioxide having a large specific surface (Aerosil) or metal powders such as aluminum powder.

The curable mixtures of the polyepoxide compounds and the new organic phosphorus compounds may be used in the unfilled or filled state, if desired in the form of solutions or emulsions, as laminating resins, paints, lacquers, dipping resins, casting resins, moulding compositions, sealing compounds, putties, flooring compositions, potting and insulating compounds for the electrical industry, adhesives, or the like, as well as for the manufacture of such products.

The new organic phosphorus compounds are also suitable as modifiers, or for use in the synthesis of new unsaturated polyesters which, compared with the known unsaturated polyester resins, on polymerization with monomers such as styrene furnish flameproof shaped products which have good tracking resistance and are only faintly colored.

The new unsaturated phosphoriferous polyesters are obtained when the following compounds are condensed by being heated in any desired order:

(1) An unsaturated dicarboxylic or polycarboxylic acid or a functional derivative thereof and/or a mixture thereof with a saturated dicarboxylic or polycarboxylic acid, (2) A diol or polyol, and (3) An organic phosphorous compound of the Formula I.

As unsaturated dicarboxylic or polycarboxylic acids from which the new phosphoriferous polyesters may be derived there may be mentioned:

Maleic, fumaric, mesaconic, citraconic, itaconic, tetrahydrophthalic, aconitic and hexachloro-endo-methylene tetrahydrophthalic acid. As functional derivatives of said acids there are suitable the corresponding acid halides, acid esters and more especially the acid anhydrides.

As optionally further added saturated dicarboxylic or polycarboxylic acids (or their derivatives) there may be mentioned, for example: Oxalic, succinic, glutaric, adipic, pimelic, suberic, azalaic, sebacic, hexahydrophthalic, tricarballylic acid; furthermore phthalic, isophthalic, terephthalic, tetrachlorophthalic, 2:6-naphthalene-dicarboxylic, diphenyl-ortho:ortho'-dicarboxylic acid, ethyleneglycol-bis-(para-carboxyphenyl) ether, pyromellitic acid and their acid halides, acid esters and acid anhydrides.

As diols or polyols from which the phosphoriferous polyesters may be derived, there may be mentioned: Ethyleneglycol, diethyleneglycol, triethyleneglycol, propyleneglycol-1:2, propyleneglycol-1:3, butanediol-1:4, 2-methylpentanediol-2:4, pentanediol-1:5, hexanediol-1:6; bis-β-hydroxyethyl ether of bisphenol A [2:2'-bis-(para-hydroxyphenyl)-propane] or tetrachloro-bis-phenol A; glycerol, diglycerol, trimethylolethane, trimethylolpropane, butanetriol-(1:2:4); hexanetriol and pentaerythritol.

The polyesters of the invention are manufactured in the known manner by heating the starting materials, if desired in the presence of an esterification catalyst such as para-toluenesulfonic acid; during this reaction it is of advantage to continuously remove the water of reaction resulting from the condensation with the aid of a solvent capable of forming an azeotrope with water, such as benzene, toluene, chlorobenzene or the like.

If desired, the manufacturing process may consist of two or more steps: At first in one or several steps a known polyester precondensate is made by heating under controlled conditions saturated and/or unsaturated dicarboxylic acids (or anhydrides thereof) with glycols, whereupon the polyester so obtained is reacted with the organic phosphorus compounds described above.

The new unsaturated polyesters may be combined in the known manner with other unsaturated polyesters and/or polymerizable monomers such, for example, as vinyl esters, acrylic acid esters, methacrylic acid esters, acrylonitrile, diallyl phthalate or more especially styrene. It is of advantage to add, for example, 20 to 40% of styrene calculated from the weight of the polyester used.

Such compositions, which contain additionally a polymerization catalyst, preferably an organic peroxide such, for example, as benzoyl peroxide, di-tertiary butyl-peroxide, lauryl peroxide, hydroxycyclohexyl hydroperoxide or more especially methylethyl ketone peroxide and, if desired, as accelerator a metal drier, such as cobalt naphthenate, are excellently suitable for use as casting or laminating resins, moulding compositions, putties and lacquer raw materials.

The curing of such compositions incorporating a peroxide may be carried out at room temperature or at an elevated temperature. It will be readily understood that such mixtures may further contain solvents and/or modifying additives such as plasticisers, flameproofing substances, mould lubricants, organic or inorganic fillers, or pigments.

As has been mentioned above, the castings, coatings and like products made from the compositions described above are distinguished by being flameproof and moreover they have good tracking resistance. Similar results are obtained by starting from curable mixtures that contain conventional unsaturated polyester resins, other polymerisable compounds such as styrene, polymerization catalysts such as organic peroxides, or organic phosphorus compounds of the Formula I as modifying agents.

In the following examples parts and percentages are by weight, and the relationship between parts by weight and parts by volume is the same as that between the kilogram and the liter.

EXAMPLE 1

A mixture of 323 parts of pentachlorophenyl glycidyl ether (containing 2.75 epoxide equivalents per kg.) and 115.5 parts of dimethyl phosphite is heated with stirring under reflux for 21 hours at 140–150° C. Within this period the boiling of the reaction mixture subsides at the same rate as dimethyl phosphite is being added on. Towards the end, the boiling has ceased completely and the epoxide content of the reaction mixture has dropped below 0.1 epoxide equivalent per kg. There are obtained 432 parts of a pale-yellow adduct which is substantially solid at room temperature and consists predominantly of pentachlorophenoxy(1)-propanol(2)-phosphonic acid dimethyl ester.

*Analysis:*

|  | Calculated, percent | Found, percent |
|---|---|---|
| Cl | 40.99 | 41.03 |
| P | 7.16 | 7.14 |
| H active | 0.23 | 0.21 |

EXAMPLE 2

A mixture of 162 parts of pentachlorophenyl glycidyl ether (containing 2.75 epoxide equivalents per kg.), 81 parts of diallyl phosphite and 0.024 part of hydroquinone is reacted as described in Example 1 for 33 hours at 150° C. The completely reacted batch contains only 0.02 epoxide equivalent per kg. The resulting pale-yellow reaction product, which is obtained in a substantially quantitative yield, is highly viscous at 20° C. and consists predominantly of pentachlorophenoxy(1)-propanol(2)-phosphonic acid diallyl ester.

*Analysis:*

|  | Calculated, percent | Found, percent |
|---|---|---|
| Cl | 36.58 | 37.53 |
| P | 6.39 | 6.45 |
| H active | 0.207 | 0.22 |

EXAMPLE 3

A mixture of 116 parts of tribromophenyl glycidyl ether (containing 2.36 epoxide equivalents per kg.; melting at 111° C.) and 48.6 parts of diallyl phosphite is reacted as described in Example 1 for 31 hours at 150° C.; the completely reacted batch contains only 0.05 epoxide equivalent per kg. The reaction product, which is obtained in a substantially quantitative yield, forms a medium viscous yellow liquid and consists predominantly of tribromophenoxy(1)-propanol(2)-phosphonic acid(3)-dimethyl ester.

*Analysis:*

|  | Calculated, percent | Found, percent |
|---|---|---|
| Br | 43.67 | 44.37 |
| P | 5.64 | 5.69 |
| H active | 0.182 | 0.20 |

EXAMPLE 4

A mixture of 60 parts of 4-bromophenyl glycidyl ether (boiling at 152° C. under 0.6 mm. Hg pressure; containing 4.4 epoxide equivalents per kg.) and 54.2 parts of di-($\beta$-chloroethyl)phosphite (boiling at 111° C. under 0.3 mm. Hg pressure) is heated for 48 hours at 140° C. and then for 16 hours at 160° C., whereupon practically no epoxide can be detected. The adduct is obtained in a substantially quantitative yield as a colorless oil.

*Analysis:*

|  | Calculated for $C_{13}H_{18}BrCl_2O_5P$, percent | Found, percent |
|---|---|---|
| C | 35.8 | 35.95 |
| H | 4.16 | 4.22 |
| H active | 0.23 | 0.21 |

EXAMPLE 5

An epoxy resin which is liquid at room temperature and has been prepared by a known method by alkaline condensation of epichlorohydrin and bis(4-hydroxyphenyl)-dimethylmethane (bisphenol A) and which contains 5.2 epoxide equivalents per kg., is mixed with the amount of phthalic anhydride or triethylene tetramine as curing agent shown in Table 1 and with the indicated amount of the reaction product of Example 1 [pentachlorophenoxy-(1)-propanol(2)-phosphonic acid (3)-dimethyl ester]. The resulting mixtures are cast in aluminum moulds (20 x 44 x 130 mm.) and cured under the conditions shown in Table 1.

*Table 1*

| Test | Parts by weight | | | | Curing conditions | |
|---|---|---|---|---|---|---|
|  | Epoxy resin | Phthalic anhydride | Triethylene tetramine | Reaction product of Example 1 | Temperature, °C. | Time, hours |
| 1 | 144.0 | 112.0 |  |  | 140 | 24 |
| 2 | 144.0 | 112.0 |  | 44.0 | 140 | 24 |
| 3 | 127.5 | 99.0 |  | 73.5 | 140 | 24 |
| 4 | 107.0 | 83.0 |  | 110.0 | 140 | 24 |
| 5 | 223.0 |  | 23.0 |  | 40 | 24 |
| 6 | 223.0 |  | 23.0 | 44.0 | 40 | 24 |

The properties of the cured castings are shown in the following

*Table 2*

| Test | Flammability (VDE) stage | Time of combustion in seconds | Bending strength (kg./mm.²) | Impact strength (cmkg./cm.²) | Heat distortion point accdg. to Martens (DIN), °C. | Water absorption, percent (4 days 20° C.) | Tracking resistance (VDE 0303) |
|---|---|---|---|---|---|---|---|
| 1 | 0 | 60 | 9.7 | 4.8 | 56 | 0.54 | T3 |
| 2 | 1 | 2 | 12.4 | 5.5 | 93 | 0.20 | T5 |
| 3 | 1 | 2 | 9.6 | 6.4 | 74 | 0.23 | T4 |
| 4 | 1 | 0 | 10.0 | 5.7 | 61 | 0.33 | T2 |
| 5 | 0 | 60 | 12.5 | 3.8 | 71 | 0.23 | T5 |
| 6 | 1 | 3 | 6.7 | 4.6 | 89 | 0.33 | T5 |

EXAMPLE 6

60 parts of an epoxy resin, which is liquid at room temperature has been obtained by a known method by alkaline condensation of epichlorohydrin with bisphenol A and contains 5.2 parts epoxide equivalents per kg., is mixed with 40 parts of phthalic anhydride and 20 parts of the reaction product of Example 4. The resulting mixture is cast in aluminum moulds (20 x 44 x 130 mm.) and cured for 24 hours at 140° C., to yield a hard, clear, light-colored casting which has the following properties:

Bending strength _____ 8.9 kg./mm.².
Impact strength _____ 6.2 cmkg./cm.².
Modulus of elasticity _____ 580 kg./mm.².
Water absorption (1 hour/100° C.) ___ 0.52%.
Heat distortion point according to
  Martens (DIN) _____ 66° C.
Flammability (VDE) _____ Stage 1.
Burning time _____ 3 seconds.

EXAMPLE 7

A mixture of 74.0 parts of phthalic anhydride, 98.0 parts of maleic anhydride, 38.0 parts of propyleneglycol, 62.0 parts of ethyleneglycol, 130.0 parts of the reaction product of Example 1, 88 parts of para-toluenesulfonic acid and 190.0 parts of toluene is subjected to azeotropic dehydration for 30 hours and the solvent is then distilled off under a vacuum of 15 mm. Hg until the internal temperature has risen to 150° C. The unsaturated polyester obtained in this manner has a softening point of 50° C. (measured on a Kofler heater) and an acid number of 48 mg. of KOH per gram; it is diluted with 154 parts of monomeric styrene and stabilized with 0.02 part of hydroquinone. There are obtained 514 parts of a resin solution having a viscosity of 6320 centipoises at 20° C. and a color index 2 according to Gardner and Holdt. Specimens of the resin solution are mixed with 0.4% of methylethyl ketone peroxide and 0.05% of a solution of 6% strength of cobalt naphthenate in butyl acetate and cured at room temperature. The resulting, very light-colored, hard castings have the following properties:

Flammability (VDE) _____ Stage 1.
Burning time _____ 0 second.
Heat distortion point according to
  Martens (DIN) _____ 51° C.
Bending strength _____ 6.1 kg./mm.².
Impact strength _____ 1.1 cmkg./cm.².
Modulus of elasticity _____ 535 kg./mm.².
Tracking resistance (VDE) _____ T5.

EXAMPLE 8

A polyester is manufactured in the known manner from 6 mols of maleic anhydride, 5 mols of isophthalic acid, 1 mol of phthalic anhydride and 13.2 mols of propyleneglycol by melt condensation at 200–220° C. This polyester has an acid number of 25 mg. of KOH per gram and a softening point of 65° C. 192 parts of a 70% solution of this polyester 76 parts of the reaction product of Example 2 [pentachlorophenoxy(1)-propanol (2)-phosphonic acid(3)-diallyl ester], 32 parts of styrene 1.2 parts of methylethyl ketone peroxide and 0.3 part of a solution of 6% strength of cobalt naphthenate in butyl acetate are mixed, poured into moulds and allowed to gel at room temperature and then the curing is completed by heating for 15 hours at 120° C.

The resulting castings have the following properties:

Flammability (VDE) _____ Stage 1.
Burning time _____ 10 seconds.
Heat distortion point according to
  Martens (DIN) _____ 49° C.
Bending strength _____ 8.3 kg./mm.²
Impact strength _____ 3.0 cmkg./cm.².
Modulus of elasticity _____ 553 kg./mm.².
Tracking resistance (VDE) _____ T4.

For comparison the polyester described above is diluted with an amount of styrene such as to produce a solution of 70% strength. When specimens of this resin solution are cured as described in Example 7, castings are obtained which are unrestrictedly flammable.

EXAMPLE 9

A mixture of 231.5 parts of the solution of 70% strength of the polyester in styrene described in Example 10, 48.5 parts of the reaction product of Example 3 [tribromophenoxy(1)-propanol(2)-phosphonic acid dimethyl ester], 20.0 parts of styrene, 1.2 parts of methylethyl ketone peroxide and 0.3 part of a solution of 6% strength of cobalt naphthenate in butyl acetate is cast in moulds, allowed to gel at room temperature and then cured for 15 hours at 120° C. The resulting castings have the following properties:

Flammability (VDE) _____ Stage 1.
Burning time _____ 3 seconds.
Heat distortion point according to Martens (DIN) _____ 45° C.
Bending strength _____ 8.7 kg./mm.².
Impact strength _____ 3.3 cmkg./cm.².
Modulus of elasticity _____ 468 kg./mm.².
Tracking resistance (VDE) _____ T5.

What is claimed is:

1. New halogenated organic phosphorus compounds of the general formula

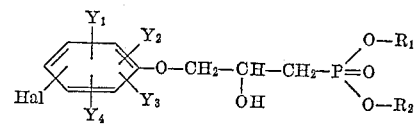

in which Hal represents a halogen atom selected from the class consisting of chlorine and bromine, each of the residues $Y_1$ to $Y_4$ represents a member selected from the class consisting of hydrogen atom, chlorine, bromine and lower alkyl radical with 1 to 4 carbon atoms, and each of the residues $R_1$ and $R_2$ represents a member selected from the class consisting of lower alkyl with 1 to 4 carbon atoms, lower alkenyl with 1 to 4 carbon atoms and lower halogenalkyl with 1 to 4 carbon atoms.

2. Pentachlorophenoxy(1) - propanol(2) - phosphonic acid(3) dimethyl ester.

3. Pentachlorophenoxy(1) - propanol(2) - phosphonic acid(3) diallyl ester.

References Cited in the file of this patent

UNITED STATES PATENTS 2,971,019     Ladd et al. _____ Feb. 7, 1961